United States Patent Office 3,832,355
Patented Aug. 27, 1974

3,832,355
CATALYTIC OXIDATION PROCESS
Gerald Myer Jaffe and Edward John Pleven, Verona, N.J., assignors to Hoffmann-La Roche Inc., Nutley, N.J.
No Drawing. Continuation-in-part of abandoned application Ser. No. 37,020, May 13, 1970. This application Mar. 28, 1972, Ser. No. 238,940
Int. Cl. C07d 15/04
U.S. Cl. 260—340.7                                    13 Claims

ABSTRACT OF THE DISCLOSURE

In the catalytic oxidation of a ketal of a sugar alcohol to a ketal of an aldonic acid in an aqueous alkaline medium with oxygen or an oxygen containing gas, utilizing a noble metal catalyst, the catalyst life is extended and the yields are increased by controlling the amount of oxygen passed through the reaction medium during the entire reaction to eliminate the presence of excess oxygen in the reaction medium and to maintain the percent of oxygen consumed from the inlet gas at a value during the reaction at least as great as that value at the start of the reaction when the presence of excess oxygen in the reaction medium was substantially eliminated.

CROSS REFERENCE TO RELATED APPLICATIONS

This application is a continuation-in-part of applicants' copending application Ser. No. 37,020, filed May 13, 1970 now abandoned.

BACKGROUND OF THE INVENTION

Known processes for producing a ketal of an aldonic acid by catalytic air oxidation are those where the oxidation is carried out by bubbling an unlimited quantity of oxygen into an aqueous medium containing a ketal sugar alcohol in the presence of a metal catalyst, while the pH of the medium is maintained at 7. Although these reported processes are capable of achieving high yields, the catalysts used therein rapidly become inactivated. For example, when conducted on a batch-wise basis, a high yield is usually attainable only on the first run with the yield per unit time rapidly decreasing with each successive run. This is due to the inactivation of the catalyst. Furthermore, during these oxidation reactions it has been found that the reaction rates have been very slow and in some cases the reaction comes to a stop prior to the conversion of all of the alcohol to the aldonic acid due to inactivation of the catalyst. Thus, the prior methods of catalytic air oxidation of a ketal of an alcohol sugar are not commercially feasible since the oxygen utilization is inefficient and the catalysts must be replaced or regenerated after each run. The resulting cost renders these catalytic air oxidations too expensive for normal commercial use.

SUMMARY OF THE INVENTION

In accordance with this invention, it has been discovered that when a ketal of a sugar alcohol is oxidized to a ketal of an aldonic acid with oxygen or an oxygen containing gas in an aqueous alkaline medium in the presence of a noble metal catalyst and the rate of feed of gas into the reaction medium is controlled so that oxygen is fed into the reaction medium at the start of the reaction at the rate wherein the presence of a substantial excess of oxygen over that consumed by the reaction medium is eliminated and the percent of oxygen consumed from the inlet gas during the entire reaction is maintained at a value at least as great as that value at the start of the reaction, the effective life of the catalyst can be prolonged for many runs. By utilizing the process of this invention, the catalyst can be reutilized for 30 runs or more while attaining yields of 80% or better during each run.

Furthermore, in accordance with this invention, it has been found that by maintaining the reaction medium at a pH of from 10 to 13 during the reaction, the aldonic acid can be obtained in higher yields and with greater efficiency by air oxidation. By carrying out the air oxidation of a ketal of an alcohol sugar to a ketal of an aldonic acid at a pH of from 10 to 13, the ketal of the aldonic acid can be obtained in yields of 90% or greater.

In accordance with another aspect of this invention, it has been found that if the oxidation of the ketal of a sugar alcohol is carried out in the presence of a metal catalyst, in an aqueous alkaline medium, while maintaining the ketal of the alcohol sugar completely in solution during the entire reaction, the oxidation reaction rates occur much faster and without any danger of the reaction coming to a standstill.

DETAILED DESCRIPTION

As used herein, the term "lower alkyl" comprehends both straight and branched hydrocarbon groups containing from 1 to 7 carbon atoms, such as methyl, ethyl, propyl, isopropyl, etc. The term "aralkyl" includes phenyl lower alkyl radicals containing from 7 to 13 carbon atoms, such as benzyl, phenethyl, phenpropyl, etc. The term "aryl" denotes phenyl and substituted phenyl groups such as lower alkyl phenyl and lower alkoxy phenyl including methyl phenyl, ethyl phenyl, ethoxy phenyl, methoxy phenyl. The term "lower alkoxy" denotes lower alkoxy groups containing from 1 to 7 carbon atoms. The term "lower alkylene" includes both straight and branched chain alkylene radicals containing from 2 to 7 carbon atoms such as ethylene, propylene, butylene, etc.

The sugars which are oxidized to aldonic acid in accordance with this invention are polyhydroxy sugars which have a free terminal hydroxy group and can have the other hydroxy groups ketalized. These sugars can also contain an oxo group which can be internally ketalized with one of the hydroxy groups of the sugar.

Among the hydroxy sugars which can be oxidized in accordance with this invention are included: ribose, sorbose fructose, glucose, arabinose, mannose, erythrose, sorbitol, heptose, mannitol, etc.

The hydroxy groups of the sugar can be ketalized with any conventional aldehyde or ketone. Among the aldehydes or ketones with which these hydroxy groups can be ketalized are included: formaldehyde, methyl ethylketone, benzaldehyde, benzyl methyl ketone, dibenzyl ketone, diethyl ketone, dimethyl ketone, etc.

The term "ketal" as used herein is defined to include any organic compound containing an alkoxy and hydroxy or two alkoxy groups wherein both alkoxy groups or both hydroxy and alkoxy groups are attached to the same carbon atom. The term ketal includes acetals and hemi acetals.

The reaction of this invention is ideally suited to the production of an aldonic acid such as 2,3:4,6-diketal of 2-oxo-gulonic acid from 2,3:4,6-diketal sorbose. This reaction can be illustrated in the following manner.

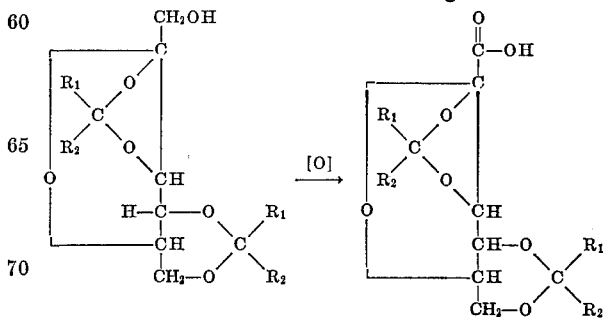

wherein $R_1$ and $R_2$ are selected from the group consisting of hydrogen, lower alkyl, aralkyl and aryl, and taken together form a lower alkylene radical.

In accordance with a preferred embodiment of this invention $R_1$ and $R_2$ are both methyl.

The reaction of this invention is carried out by feeding oxygen gas or an oxygen containing gas through a reaction medium containing a ketal of a sugar alcohol in an aqueous alkaline medium in the presence of a noble metal catalyst. Normally, the oxidation of a ketal alcohol sugar with oxygen or an oxygen containing gas is effected in a batch-wise manner. However, this invention provides a means for utilizing either a batch or a continuous process. Thus, the ketal alcohol sugar and the catalyst in the aqueous alkaline medium are charged to a reactor and oxygen or an oxygen containing gas is fed into the reactor until substantial completion of the oxidation, generally, to about 90% conversion of the ketal sugar to the ketal of aldonic acid.

The gas which is passed into the reactor can be oxygen or any oxygen containing gas, preferably air. However, if desired, the oxygen content of the air can be reduced by adding nitrogen to the air. On the other hand, air enriched with oxygen can be utilized as the gaseous medium for effecting the conversion in accordance with this invention. On the other hand, if desired, pure oxygen can be fed into the reaction medium to effect the conversion in accordance with this invention.

In accordance with this invention, when oxygen or an oxygen containing gas is fed into the reaction system at a controlled rate, maximum catalyst life is obtained while maintaining high conversion rates.

In accordance with this invention, it has been found that when a ketal of a sugar alcohol is converted to a ketal of an aldonic acid by oxidation with oxygen or an oxygen containing gas, in the presence of a noble metal catalyst in an aqueous alkaline medium, maximum catalyst life is obtained while maintaining high conversion rates when at the start of the reaction, the oxygen in the gas is fed into the reaction medium at a rate wherein the presence in the reaction medium of a substantial excess of oxygen over that consumed by the reaction medium is eliminated and during the entire reaction, the percent of oxygen consumed from the inlet gas is maintained at a value at least as great as that value at the start of the reaction.

In accordance with this invention, when oxygen or an oxygen containing gas is fed into the reaction system at the start of the reaction at a rate of at most 0.4 moles of oxygen per hour per mole of the ketal alcohol sugar initially present in the reaction or initially charged to the reaction system, the presence of a substantial excess of oxygen in the reaction medium over that consumed by the reaction is eliminated. On the other hand, when the gas is initially fed into the reaction medium to provide a substantial excess of oxygen, i.e., over 0.4 moles of oxygen per hour per mole of sugar alcohol initially present in the reaction, the catalyst, in some cases, can be destroyed after one run. Utilizing even lower initial gas feed rates to supply 0.05 moles to 0.3 moles of oxygen per hour per mole of the ketal of the sugar alcohol initially present can provide even longer catalyst life. However, when utilizing low initial gas feed rates such as in the order of 0.01 moles of oxygen per hour per mole of the ketal of alcohol sugar charged, the catalyst life is prolonged, but conversion occurs very slowly. Therefore, in accordance with a preferred embodiment of this invention, initial oxygen feed rates of from 0.05 to 0.3 moles of oxygen per mole per hour of the ketal sugar alcohol charged are generally utilized with an initial oxygen feed rate of from 0.11 to 0.2 moles of oxygen per hour per mole of the ketal alcohol sugar being especially preferred.

After the flow of the gas at the start of the reaction has been regulated so that the oxygen is fed into the reaction medium at a rate which eliminates the presence in the reaction of a substantial excess of oxygen over that consumed by the reaction, the percent of oxygen consumed from the inlet gas is regulated during the reaction so that it is at least as great during the reaction as it was at the start of the reaction. If one would maintain a constant inlet flow rate during the entire reaction, the percent of oxygen consumed by the reaction could decrease during the reaction as more of the ketal of the alcohol sugar is converted to the ketal of aldonic acid. Therefore, when utilizing high initial feed rates such as about 0.4 moles of oxygen per mole of the ketal sugar per hour, it is necessary, during the reaction, to constantly lower the oxygen feed rate in order to maintain the percent of oxygen consumed from the inlet gas constant or at least as great as that at the start of the reaction where 0.4 moles of oxygen per hour per mole of the ketal of the alcohol sugar initially charged was fed into the reaction medium.

The percent oxygen consumed in the reaction is based upon the amount of oxygen passed into the reaction medium from the inlet gas. The percent oxygen consumed from the inlet gas can be obtained by the following formula:

$$\text{Percent } O_2 \text{ consumed} = \left( \frac{\text{moles of } O_2 \text{ inlet gas/hr.} - \text{moles of } O_2 \text{ outlet gas/hr.}}{\text{moles of } O_2 \text{ in inlet gas/hr.}} \right) \times 100$$

In order to maintain, during the entire reaction, the percent of oxygen consumed in the reaction from the inlet gas at a value of at least the value of oxygen consumed at the initial stage of the reaction, the flow rate of the inlet gas may have to be diminished during the reaction, since less oxygen is needed by the reaction as the initial charge of the ketal of the alcohol sugar is converted to the ketal of the aldonic acid. Therefore, if one is feeding at the start of the reaction all the oxygen needed by the reaction, it will be necessary to diminish this feed during the reaction to prevent the build up of excess oxygen. This can be done by conventional metering devices well known in the art. One method of preventing the build up of oxygen during the reaction is by maintaining the percent of oxygen consumed by the reaction at a constant value or at a value greater than the value obtained at the start of the reaction. If during the reaction the percent of oxygen consumed from the inlet gas falls to a lower value than at the start of the reaction where oxygen is fed into the reaction medium at a rate of at most 0.4 moles of oxygen per hour per mole of the ketal of the sugar alcohol, then the flow rate of the inlet gas or the amount of oxygen in the inlet gas is reduced so that the percent of oxygen consumed from the inlet gas is at a value of at least the value it was during the initial stage of the reaction. Another means of regulating this oxygen consumption is by regulating the partial pressure of oxygen in the inlet and outlet gases. In this manner, the rate of oxygen feed is regulated so that the difference obtained by subtracting from the partial pressure of oxygen in the inlet gas, the partial pressure of oxygen in the outlet gas during the reaction, is never less than the value of this difference at the start of the reaction where at most 0.4 moles of oxygen per hour per mole of the ketal of the alcohol sugar was fed into the system.

When the oxygen or oxygen containing gas is fed, under controlled conditions into the reaction medium, maximum catalyst life is obtained while maintaining high conversion rates. When the gas is fed into the reaction medium at a rate of at most 0.4 moles of oxygen per hour per mole of the sugar alcohol, and the percent of the oxygen consumed from the inlet gas is maintained at least at the initial value during the entire reaction, the catalyst life can be extended for an indefinite series of runs. However, even longer catalyst life is obtained utilizing smaller initial oxygen feed rates, i.e., from 0.05 to 0.3 moles of oxygen per hour per mole of the ketal sugar alcohol and by maintaining the percent of the oxygen consumed from the inlet gas at least at the initial value during the entire reaction.

In accordance with this invention, it has been found that when oxygen is passed into the reaction system at a low flow rate, i.e., 0.10 moles or less of oxygen per hour per mole of the diketal alcohol initially charged, there may be no necessity to regulate the inlet flow rate of the gas below this value. At these low flow rates, substantially all of the oxygen present in the reaction medium can be consumed during the reaction. However, when utilizing these flow rates depending on reaction conditions such as temperature, pressure and rate of agitation, the reaction can proceed slowly, sometimes 25 hours or more.

In accordance with a preferred embodiment of this invention, it has been found that by first adjusting flow rates to a high level, i.e., from 0.10 to 0.4 moles of oxygen per hour per mole of the diketal alcohol charged at the start of the reaction and then continuously reducing this flow rate during the reaction to maintain the oxygen consumption during the reaction at a level at least as great as it was at the start of the reaction, depending on reaction conditions such as temperature, pressure and rate of agitation, reaction times of 10 hours or better can be achieved, without loss of catalyst activity.

The gaseous feed is passed through the reaction medium until substantial completion of the oxidation, generally, to about at least 90% conversion of the ketal of the sugar alcohol to the ketal of the aldonic acid. The course of this reaction can be determined by conventional means such as by taking small samples of the reaction medium during the reaction, or from the oxygen consumption, or from the difference in partial pressure of oxygen in the outlet and inlet gases.

Any metal catalyst conventionally employed in oxidation reactions can be utilized in accordance with this invention. Generally preferred are the noble metals such as platinum or palladium. Another type of preferred catalyst is the noble metal catalyst modified with another metal, such as palladium modified with platinum, gold or other precious metal. A particularly preferred catalyst modified with a second metal consists of a mixture of palladium and gold with a carbon carrier, especially a mixture of 2 to 20 percent by weight palladium and 0.1 percent to 5 percent by weight gold, with the balance being the carbon carrier. The catalyst may be employed in either a supported or an unsupported form. Suitable unsupported catalysts include platinum and palladium blacks which have been prepared by formaldehyde reduction. Although catalysts of this type are effective, preferred catalysts comprise platinum or palladium deposited on a high surface area support, preferably one having a surface area of at least 500 square meters per gram and especially at least about 700 square meters per gram and which is relatively inert to basic reaction conditions. A preferred catalyst support is activated carbon. The ratio of catalytic metal to support is not particularly critical, however, and may range from about 0.5 to 50% by weight with a range of from about 1 to about 10% by weight being preferred.

In carrying out the process of this invention, the catalyst can be present in the reaction medium to provide the metal in an amount of from about 0.1% to 20% by weight, based upon the weight the ketal of the sugar alcohol charged to the reaction medium. Generally, it is preferred to utilize a supported catalyst which contains the metal in an amount of about 0.5% by weight to about 10% by weight and the support in an amount of from about 0.5% to 50% by weight based upon the weight of the ketal of the alcohol sugar initially charged to the reactor.

In carrying out this reaction, the reaction medium generally contains from about 100 grams per liter to about 250 grams per liter of the ketal of the sugar alcohol. In accordance with this invention, the reaction is carried out in an aqueous medium. If desired, an inert organic solvent can be added to the aqueous reaction medium. Any conventional inert organic solvent can be utilized in this respect.

In carrying out this reaction, elevated temperatures are generally employed. Generally, temperatures in the range of from about 40° C. to about 180° C. are employed with temperatures in the range of 110° C. to 135° C. being especially preferred. If desired, this reaction can be carried out at atmospheric pressure. However, pressures of from 15 p.s.i.g. to 150 p.s.i.g. are generally employed. If desired, pressures higher than 150 p.s.i.g., i.e., as high as 300 p.s.i.g. can be utilized.

As indicated above, the reaction is conducted in basic media. The necessity for basic conditions arises because of the instability of the ketal groups under acidic conditions. If these groups are split off, the resulting product is readily destroyed, resulting in a serious loss of yield and efficiency. Thus, the base is employed in an amount sufficient to at least neutralize the ketal of the aldonic acid as it is formed. In accordance with an embodiment of this invention, it has been found that if the base is present in sufficient excess to maintain a pH of at least about 10, greater yields and longer catalyst life is obtained. Therefore, in accordance with a preferred embodiment of this invention, pH's of from 10 to 13 can be utilized. However, if desired, this reaction can be carried out at a pH of at least 7.5. But, for the best results, it is preferred to utilize a pH of from 10 to 13. It is undesirable to maintain the reaction mixture at a pH in excess of about 13, since such elevated pH's can adversely affect catalyst activity.

In the preferred embodiment of this invention, any base which is stable under the reaction conditions, compatible with the reactants and capable of attaining an initial pH of at least 7.5 can be employed. Alkali metal hydroxides such as sodium hydroxide, potassium hydroxide and lithium hydroxide are preferred. Among the other bases which can be utilized are included alkaline earth metal hydroxides, such as calcium hydroxide; amines such as ethylamine, diethylamine, triethylamine, triethanolamine and the like; and quaternary ammonium hydroxides such as benzyltrimethylammonium hydroxide, etc. Basic salts such as sodium carbonate, sodium bicarbonate and buffers such as sodium phosphate and the like, as well as mixtures thereof, may be employed but are not generally desirable since they do not attain the preferred pH range and thus depress the yields. Of the amines, tertiary amines are preferred because of their superior resistance to oxidation. The inorganic bases are preferred, especially those which provide a pH in excess of 10, such as the alkali metal and alkaline earth metal hydroxides. Sodium hydroxide is particularly preferred because of its ready availability and its beneficial effects on the reaction. Bases such as sodium bicarbonate, which provide an initial pH in the range of about 7 to 8 can be used as the base but are much less desirable because a pH of less than about 10 results in reduced catalyst activity and lower yields.

In still another aspect of this invention, we have found that the productivity of the catalyst, i.e., the ratio of total product i.e. the ketal of the aldonic acid produced in a series of runs to the total catalyst utilized in these runs, can be substantially increased by periodically adding fresh catalyst to the used catalyst. For example, by adding small amounts of fresh catalyst when the originally charged catalyst begins to show signs of reduced activity, there is a restoration of activity which is greater than that which can be attributed to the presence of the fresh catalyst alone. Moreover, a similar rejuvenation of catalyst activity is obtained merely by adding the support material alone. The reason for this increased activity is not clear, but apparently the catalyst is inactivated, at least in part, by destruction of the carrier, thus forming unsupported metal particles and reducing the effective surface area of the catalyst. Thus, the added support material may reabsorb the free catalyst metal, thereby increasing catalyst surface area and activity.

It is not necessary to wait for signs for catalytic inactivity before adding fresh catalyst. Thus, fresh catalyst or support material may be added in small increments periodically and one may still obtain improved yields per weight of catalyst charged over those obtained when the same total amount of catalyst was charged initially and recycled. The time of addition is not critical, although it is generally preferred to add the fresh catalyst to the used catalyst prior to recycling to the reaction, during batch operations.

The amount of fresh support and/or catalyst which is added periodically is not critical, and will depend upon the amount of the initial charge, as well as the rate of inactivation, which in turn depends upon reaction conditions such as amount of excess oxygen, alkalinity and the like, as discussed above. In general, it has been found that a suitable schedule comprises employing sufficient catalyst to supply from about 0.1 to about 20 weight percent of the metal based upon the weight of the ketal sugar alcohol, as an initial charge, and thereafter adding from about 5 to about 25 weight percent of fresh support and/or catalyst metal, based upon the total weight of originally charged catalyst (catalyst metal plus support) prior to recycling the used catalyst for a second run.

The length of the reaction period for the conversion of the sugar alcohol ketal to ketal of the aldonic acid is not highly critical to this invention. It is generally preferred, however, to carry the reaction to at least about 90% conversion of ketal sugar alcohol because the purity of the aldonic acid is directly proportional to yield. The product is normally recovered by filtration of the catalyst from the reaction mixture followed by acidification of the reaction mixture to precipitate the aldonic acid product. Because some unreacted ketal of the alcohol sugar tends to co-precipitate with the aldonic acid product, reduced amounts of unconverted ketal sugar alcohols in the reaction mixture results in an increase in the purity of the product.

The reactor employed is preferably one providing intimate mixing of the gas, liquid and solid phases, with increased reaction rates resulting from higher degrees of mixing or agitation. For this reason, stirred, baffled reactors are highly preferred.

In accordance with another aspect of this invention, it has been found that faster reaction rates and the danger of the reaction coming to a standstill can be eliminated by maintaining the ketal of alcohol sugar completely in solution during the reaction. One means of accomplishing this is by maintaining the proper interrelation of the ketal alcohol sugar and base concentrations and reaction temperature.

In the past, it was found that initial ketal alcohol sugar concentrations of up to about 15 grams per 100 cc. of aqueous reaction medium were feasible, but that a substantial decrease in reaction rate resulted at higher concentrations. We have found that the decreased reaction rate at the more elevated concentrations resulted because the solubility of the ketal alcohol sugar is inversely related to temperature and base concentration. Thus, in the previously employed techniques, an aqueous charge containing the ketal alcohol sugar and at least the amount of base necessary to neutralize aldonic acid product was fed to the reactor. With this technique, although the initial reaction medium was a solution at room temperature, upon heating it to the desired initiation or reaction temperature, the ketal alcohol sugar separates when present in excessive amounts. At the elevated temperatures of the reaction, the excess ketal alcohol sugar separated from the reaction medium on to the catalyst system thereby reducing the effective catalyst surface and thus the reaction rate. Accordingly, to achieve commercially feasible production rates it is essential to operate at all times under conditions at which the ketal of the alcohol sugar is completely dissolved.

As indicated above, as ketal alcohol sugar concentrations of less than about 15 grams per 100 cc. of aqueous reaction medium, the ketal alcohol sugar is completely dissolved at temperatures of up to at least 100° C. and the normally employed base concentrations (generally not more than about 2 molar equivalents of base per mole of the ketal of the alcohol sugars). On the other hand, phase separation occurs at room temperature at ketal alcohol sugar concentrations of about 55 to 60 grams per 100 cc. of aqueous reaction medium even without added base.

Concentrations within these limits of 15 to 55 grams per 100 cc. of aqueous reaction medium can be employed, however, by carefully controlling the amount of free base in the reaction mixture, with the permissible amount of free base varying inversely with the concentration of the ketal alcohol sugar and temperature. For example, only slight amounts of free base can be present at ketal alcohol sugar concentrations of about 35 to 55 grams per 100 cc. of aqueous medium whereas larger amounts can be present at concentrations of about 15 to 20 grams per 100 cc. Similarly, at constant ketal alcohol sugar concentrations, smaller amounts of base may be employed at a reaction temperature of, for example, 100° C., than at a less elevated temperature such as 60° C. The precise maximum amount of base permissible at any set of reaction conditions is readily determined by formulating various aqueous, alkaline ketal sugar alcohol solutions and determining the temperature at which phase separation occurs. In general, we have found that, at a temperature of about 90 to 100° C. and an initial ketal alcohol sugar concentration of about 25 grams per 100 cc., the initial ratio of equivalents of free base to equivalents of ketal alcohol sugar should be not greater than about 0.1:1. As the reaction proceeds, additional base is added to replenish that consumed in neutralizing the aldonic acid product, with greater ratios of base to the ketal alcohol sugar being permitted in the batch process as the concentration of the ketal alcohol sugar decreases; however, as will be readily apparent, in a continuous process, the ratio must remain substantially constant. This addition may be made periodically or continuously, as desired.

It should be noted that the desirability of controlling the amounts of base and the concentration of the ketal alcohol sugar and the temperature is not limited to the catalytic air oxidation of ketal alcohol sugar. To the contrary, it is applicable to any process for oxidizing ketal alcohol sugars, such as processes employing electrolytic means or chemical oxidizing agents, such as potassium permanganate, hydrogen peroxide, sodium hypochlorite, and the like.

Another means of maintaining the ketal alcohol sugar in solution during the reaction is by employing ketal alcohol sugar concentrations of between 15 and 55 grams per 100 cc. of aqueous reaction medium by initiating the reaction at a reduced temperature, i.e., below that at which phase separation occurs, and then increasing the reaction temperature as the concentration of the ketal alcohol sugar decreases. This latter technique requires long reaction times, however, and is not preferred for commercial use.

As a further alternative, one can maintain the ketal alcohol sugar concentration in the reaction mixture at a desired level, e.g., below 15 grams per 100 cc. of the aqueous reaction medium at all times, while achieving high conversions per volume by the periodic addition of the ketal alcohol sugar to the reaction mixture. This technique is preferred in a continuous process because it has been found that while the rate of reaction is independent of the concentration of ketal alcohol sugar, the time of conversion is generally proportional to this concentration. Thus, at low concentrations of the ketal alcohol sugar longer times are required for effecting a complete conversion. Moreover, if all the base required for the production of the aldonic acid salt is added initially, the presence of such large concentrations of base over the longer reaction time necesary for substantially complete conversion has a detrimental effect on catalyst life.

Finally, if desired, one may employ a combination of any two or all three of these techniques. For example, one may employ a low initial reaction temperature, coupled with the gradual addition of ketal alcohol sugar and/or base.

The following examples are illustrative but not limitative of the invention. In all of the examples, the oxygen consumption per unit time was calculated by the formula given hereinbefore.

Example 1

The apparatus employed comprised a vertical 45 millimeter ID by 685 millimeter high jacketed column having a stainless steel 3 millimeter thick sintered disk at the bottom of the column. The air was diluted with nitrogen to provide a gas containing 2% by volume oxygen. This gas was scrubbed by filtration, bubbling through concentrated sulfuric acid and dilute sodium hydroxide and then was fed upward through the column. After establishment of gas flow, the reactor was charged with an aqueous solution of 50 grams (0.192 moles) of diacetone-1-sorbose (DAS) in 500 milliliters of an aqueous solution containing 1.6% by weight of sodium hydroxide. There was then added 5 grams of a platinum-on-carbon catalyst containing 5% by weight platinum and 95% by weight carbon. The gas containing a fixed amount of oxygen and nitrogen was passed into the reaction medium and the temperature of the reaction mixture was raised to 90° C. by passing hot water through the reaction jacket. The oxygen consumption was determined for this flow rate. The gas flow rate was regulated during the reaction so that the oxygen consumed during the reaction was maintained at a level at least as great as that at the start of the reaction. The oxygen content of the outlet gas was continually measured by a Beckman Oxygen Analyzer. The flow rate was reduced during the reaction according to the following schedule:

| Time, hrs./mins. | $O_2$ feed rate (moles $O_2$/hr. mole of DAS | Exit $O_2$ concentration percent by volum | $O_2$ consumption (percent by volume of $O_2$ fed) |
|---|---|---|---|
| 1/0 | 0.125 | 1.82 | 9.0 |
| 2/15 | 0.124 | 1.80 | 10.0 |
| 4/15 | 0.124 | 1.60 | 20.0 |
| 5/10 | 0.121 | 1.42 | 29.0 |
| 8/0 | 0.120 | 1.21 | 39.5 |
| 9/15 | 0.117 | 1.28 | 36.0 |
| 11/10 | 0.111 | 1.26 | 37.0 |
| 13/15 | 0.107 | 1.27 | 36.5 |
| 15/35 | 0.105 | 1.22 | 39.0 |
| 17/40 | 0.103 | 1.20 | 40.0 |
| 19/45 | 0.103 | 1.34 | 33.0 |
| 21/25 | 0.091 | 1.02 | 49.0 |
| 23/20 | 0.090 | 1.40 | 30.0 |
| 25/15 | 0.083 | 1.62 | 19.0 |
| 26/0 | 0.080 | 1.72 | 14.0 |
| 27/30 | 0.077 | 1.79 | 11.0 |
| 28/0 | 0.077 | 1.80 | 10.0 |

After 28 hours at these conditions, the reaction mixture was cooled, the catalyst was filtered off and washed with water. The combined filtrate and water washes were concentrated under vacuum. After cooling to 4° C., the concentrate was acidified with 2N hydrochloric acid to precipitate diacetone-2-oxo-1-gulonic acid. The reactor was again charged with diacetone sorbose solution and catalyst, this time employing recycled catalyst from the first run and the oxidation carried out as described. The series of runs was continued in exactly the same manner as the initial run described. No loss of catalytic activity was observed at the end of the series of runs.

An additional series of runs was conducted under similar conditions, except that the oxygen content of the gas was increased to 10%. During these series of runs, the initial gas flow rate of 0.6 moles of oxygen per mole of diacetone sorbose initially charged was maintained during the reaction.

The yields obtained per run in each of the above two series are summarized in Table I.

TABLE I

| | A | B |
|---|---|---|
| Oxygen concentration in gas feed, percent by volume | 2 | 10 |
| Initial oxygen feed rate, mols/hour per mole of DAS | 0.125 | 0.6 |
| Yields: Run number: | | |
| 1 | 90.2 | 89.2 |
| 2 | 92.7 | 90.1 |
| 3 | 94.1 | 83.2 |
| 4 | 93.2 | 57.8 |
| 5 | 92.5 | 39.9 |
| 6 | 94.7 | 56.5 |
| 7 | 94.1 | 0 |
| 8 | 93.2 | |
| 9 | 90.2 | |

Example 2

Employing apparatus and procedures similar to those described in Example 1, except that the platinum catalyst was replaced by 5 grams of a 10% palladium-on-carbon catalyst, two series of experiments were run employing air or an oxygen-nitrogen mixture containing 2% by volume oxygen. The results of these series are summarized in Table II. The air flow rate was continually decreased during the reaction to provide a uniform oxygen consumption during the entire reaction.

TABLE II

| | A | B |
|---|---|---|
| Oxygen concentration in gas feed, percent by volume | 2 | 21 |
| Initial oxygen feed rate, moles per hour per mole of DAS | 0.126 | 1.215 |
| Oxygen consumption, percent by volume of oxygen fed | 30 | 3 |
| Yields: Run number: | | |
| 1 | 87.5 | 90.2 |
| 2 | 95.1 | 89.4 |
| 3 | 89.2 | 0 |
| 4 | 88.3 | 0 |
| 5 | 87.7 | |
| 6 | 94.1 | |
| 7 | 90.1 | |
| 8 | 93.9 | |
| 9 | 84.8 | |
| 10 | 84.8 | |
| 11 | 86.5 | |
| 12 | 81.7 | |
| 13 | 83.6 | |
| 14 | 98.6 | |

As is readily apparent from a comparison of Tables I and II, the reduction in the amount of excess oxygen in an oxidation employing palladium in place of platinum as the catalyst similarly increases the catalyst life.

Example 3

Employing apparatus and procedures similar to those described in Example 2, except that a 2,000 milliliter, jacketed, stirred reactor equipped with two 6-bladed propellers was substituted for the column reactor and the amount of reactants, water and catalyst were increased by 50%, two series of reactions were run. In the first series the gas stream comprised of 2% by volume oxygen in a nitrogen-oxygen mixture and in the second series was undiluted air. In both cases the oxygen feed rate was decreased during the reaction to maintain the oxygen consumption during the reaction at a level at least as great as that value during the start of the reaction. The results from these two series are summarized in Table II. The schedule whereby the flow rate was reduced in the runs of series A is given in Table IIIA.

TABLE III

| | A | B |
|---|---|---|
| Oxygen concentration in feed gas, percent by volume | 2 | 21 |
| Initial oxygen feed rate mols/ hour/per mole DAS | 0.081 | 0.105 |
| Yield: | | |
| Run number: | | |
| 1 | 94.5 | 90.4 |
| 2 | 91.1 | 92.1 |
| 3 | 92.5 | 93.5 |
| 4 | 83.5 | 91.0 |
| 5 | 93.2 | 89.5 |
| 6 | 90.1 | (1) |
| 7 | 94.1 | |
| 8 | 87.8 | |
| 9 | 89.5 | |
| 10 | 89.7 | |
| 11 | 89.6 | |

[1] Not continued after fifth run.

TABLE IIIA

| Time, hrs./mins. | O₂ feed rate (moles O₂/hr./ mole of DAS) | Exit O₂ concentration (volume %) | O₂ consumption (percent volume of O₂ fed) |
|---|---|---|---|
| 2/0 | 0.081 | 0.88 | 56 |
| 3/0 | 0.080 | 0.79 | 60.6 |
| 5/0 | 0.080 | 0.84 | 58.0 |
| 7/30 | 0.079 | 0.78 | 61.0 |
| 8/50 | 0.073 | 0.80 | 60.0 |
| 10/35 | 0.066 | 0.78 | 61.0 |
| 12/20 | 0.053 | 0.52 | 74.0 |
| 14/10 | 0.038 | 0.45 | 77.5 |
| 15/50 | 0.029 | 0.38 | 81.5 |
| 17/45 | 0.022 | 0.33 | 83.5 |
| 19/30 | 0.028 | 0.29 | 85.5 |
| 21/10 | 0.023 | 0.27 | 86.5 |
| 22/0 | 0.023 | 0.26 | 87.0 |

Example 4

Employing the apparatus described in Example 3, the stirred reactor was charged with 150 grams of diacetone sorbose (DAS), 3.2 grams of sodium hydroxide, 699 milliliters of water and 10 grams of 10 percent palladium-on-carbon catalyst. For the first eight runs an oxygen-nitrogen mixture containing 2 percent by volume oxygen was fed into the reactor while maintaining the reaction mixture at 91–93° C. After these eight runs, a gas containing 4% by volume of oxygen was passed into the reactor under the same conditions. A series of runs was carried out utilizing this increased oxygen feed. During each run the oxygen consumption was kept constant by regulating the gas flow. During each run 9.9N sodium hydroxide was added according to the following schedule:

| Time (Hours) | Sodium Hydroxide (Milliliters) |
|---|---|
| 3 | 5.5 |
| 5 | 9.0 |
| 8 | 15.0 |
| 13 | 14.5 |
| 18 | 7.0 |

The results obtained from these series of experiments is set forth in Table IV:

TABLE IV

| | | |
|---|---|---|
| Oxygen concentration in feed gas, percent by volume | 2 | 4 |
| Oxygen feed rate, mols/ hour per mole of DAS | 0.11 | 0.15 |
| Oxygen consumption, percent by colume of oxygen fed | 38 | 33 |
| Yields: | | |
| Run number: | | |
| 1 | 96.1 | |
| 2 | 95.2 | |
| 3 | 95.0 | |
| 4 | 94.5 | |
| 5 | 91.7 | |
| 6 | 92.5 | |
| 7 | 94.6 | |
| 8 | 94.5 | |
| 9 | | 94.9 |
| 10 | | 93.5 |
| 11 | | 94.3 |
| 12 | | 93.0 |
| 13 | | 94.7 |
| 14 | | [1] 82.9 |
| 15 | | 94.0 |
| 16 | | 94.1 |

[1] Because the catalyst showed signs of inactivation, as indicated by reduced rate, two grams of fresh catalyst were added to restore the activity.

As is readily seen, the gradual addition of sodium hydroxide during each run permits the use of an initial diacetone sorbase concentration of 20 percent.

In Examples 5–7, the following procedure was utilized:

The apparatus employed a reactor 12⅜ inches I.D. and 32 inches high which is equipped with two flat disc turbine agitators each having a diameter of 4 inches and a ratio of blade width to turbine diameter of ⅕. Into this reactor there was placed 6 kilograms of diacetone-1-sorbose dissolved in 30 liters of water. Sufficient quantity of aqueous 37% by weight sodium hydroxide was added to maintain the pH at about 12.4. To this reaction mixture there was added 100 grams of palladium on carbon catalyst consisting of 10% by weight of palladium and 90% by weight of carbon. Air (21% by volume oxygen) was passed through the reactor while the contents of the reactor were maintained at a temperature of 130° C. under 45 p.s.i.g. pressure. The agitator was run at a speed of 840 r.p.m.

After conversion was complete (about 96% conversion) the reaction mixture was cooled, the catalyst was filtered off and washed with water. The combined filtrate and water washes were concentrated under vacuum. After cooling to 4° C. the concentrate was acidified with 2N hydrochloric acid to precipitate diacetone-2-oxo-1-gulonic acid. The reactor was again charged with diacetone sorbose solution and catalyst, this time employing recycled catalyst from the first run and the oxidation carried out as described above. Each of the series of runs and the oxidation procedure was carried out as described. The runs were continued until a substantial loss of catalyst activity, as indicated by reduced yield (below 60%) was observed. In each run after the first run, 12.5 grams of fresh 10% palladium on carbon catalyst was added to the recycled catalyst.

Example 5

In this example, air was continually passed through the reactor at a rate of 0.5 moles of oxygen per hour per mole of diacetone sorbose. During the entire run the oxygen consumption was maintained at a constant level by continually decreasing the flow of air into the reaction medium. In each run the reaction was carried out for 2 hours, the point in time at which no further conversion was obtained. Four runs were carried out. The results of these runs are listed in the following table. In this table, the oxygen consumption was calculated by the method given hereinbefore.

| Run | Time, hours | Percent conversion | Exit oxygen concentration (volume percent) |
|---|---|---|---|
| 1 | 3 | 95 | 1.4 |
| 2 | 3 | 83 | 4.4 |
| 3 | 3 | 64 | 6.7 |
| 4 | 3 | 53 | 8.4 |

Example 6

In this example, air was passed through the reactor at a rate of 0.12 moles of oxygen per hour per mole of DAS. During the entire run the oxygen consumption was maintained at a constant level by continually decreasing the flow of air into the reaction medium. The reaction was continued for about 10 hours, the point in time at which no further conversion was obtained. At least 25 runs were carried out. At the end of the 25th run, the percent conversion was still 92.3%. The results of these runs are given in the following table. Only the first and 25th runs are illustrated since the same results were obtained in all of the runs. The oxygen consumption was calculated by the method hereinbefore given.

| Run | Time, hours | Percent conversion | Exit oxygen concentration (volume percent) |
|---|---|---|---|
| 1 | 10 | 92 | 1 |
| 25 | 10 | 92 | 1 |

EXAMPLE 7

In this example, air was passed through the reactor at a rate of 0.14 moles of oxygen per hour per mole of DAS. The reaction was continued for about 6.5 hours, the point in time at which no further conversion was obtained. At least 25 runs were carried out. At the end of the 25th run, the percent conversion was still 93%. The results of these runs are given in the following table. Only the first and 25th runs are illustrated since the same results were obtained in all of the runs. The oxygen consumption was calculated by the method herebefore given.

| Run | Time, hours | Percent conversion | Exit oxygen concentration (volume percent) |
|---|---|---|---|
| 1 | 6.5 | 93 | 1.4 |
| 24 | 6.5 | 93 | 1.4 |

EXAMPLE 8

The apparatus used was similar to the one described in Example 4. It employed a 2000 milliliter reactor, equipped with one open 6-flat blades turbine, baffles and single orifice sparger. The reactor was charged with 513 milliliters of an aqueous solution containing 150 grams of diacetone-1-sorbose (DAS) and 3 grams of sodium hydroxide, 199 milliliters of water and 5 grams of 2% any weight palladium-on-carbon catalyst. An oxygen-nitrogen mixture containing 4% by volume oxygen was fed to the reactor at a rate of 780 milliliters per minute while maintaining the reaction mixture at a temperature of 110° C. under 15 p.s.i.g. pressure. During each run, the oxygen consumption was kept constant by regulating the gas flow. During each run, 9.7N sodium hydroxide was added according to the following schedule:

| Time (Hours): | 9.7N Sodium hydroxide (Milliliters) |
|---|---|
| 1 | 6.0 |
| 2.25 | 9.0 |
| 4 | 15.5 |
| 6.50 | 15.0 |
| 9 | 9.0 |

The reaction was complete after 13 hours. The reaction mixture was cooled, the catalyst was filtered off and washed with water. The combined filtrate and water washes were concentrated under vacuum. After cooling to 4° C., the concentrate was acidified with 2N hydrochloric acid to precipitate diacetone-2-oxo-1-gulonic acid. The reactor was again charged with diacetone-1-sorbose solution and catalyst, this time employing recycled catalyst from the first run and also some fresh catalyst according to the following schedule:

| Run number: | 2% Pd/C catalyst Recycled (grams) | Fresh (grams) |
|---|---|---|
| 1 |  | 5 |
| 2 | 5 | 3 |
| 3 | 8 | 3 |
| 4 | 8 | 3 |
| 5 | 8 | 3 |
| 6 | 8 | 3 |
| 7 | 8 | 3 |
| 8 | 8 | 3 |
| 9 | 8 | 3 |
| 10 | 8 | 3 |
| 11 | 8 | 3 |

The oxidation was carried out as described above. The series of runs was continued for 11 runs. Even after 11 runs, there was no substantial loss of catalytic activity. The results of these runs are given in Table V.

TABLE V

Oxygen Concentration in Fed Gas, Percent by Volume _____ 4
Initial Oxygen Feed Rate, Moles per Hour per Mole of DAS _____ 0.145
Oxygen Consumption, Percent of Oxygen Fed ____ 65
Yields:
Run No.
1 _____ 94.9
2 _____ 94.5
3 _____ 96.1
4 _____ 95.1
5 _____ 95.0
6 _____ 95.6
7 _____ 95.8
8 _____ 95.4
9 _____ 95.1
10 _____ 94.4
11 _____ 95.2

EXAMPLE 9

Utilizing the procedure of Example 8, except that the reaction temperature was 130°, the pressure was 45 p.s.i.g., and the catalyst was 10% Pd/0.5% Au/Carbon, DAS was air oxidized. The catalyst was recycled with small increments of fresh catalyst being added in each run. Each experiment was run for a fixed period of 7 hours. Samples were taken at the end of each run and analyzed spectrophotometrically for DAG and DAS and the percent DAG conversion calculated.

The results are summarized in Table VI.

TABLE VI
Catalyst: 10% Pd/0.5% Au(carbon (Engelhard)

| Run number | Catalyst Added (gm.) | Catalyst Total (gm.) | Percent DAG conversion |
|---|---|---|---|
| 1 | 1.875 | 1.875 |  |
| 2-3 | 0.625 | 3.125 | 72.2 |
| 4-10 | 0.313 | 5.316 | 71.9 |
| 11-17 | 0.313 | 7.507 | 64.0 |
| 18-25 | 0.157 | 8.763 | 70.5 |
| 26-31 | 0.157 | 9.705 | 68.7 |

The results show that the 10% Pd/0.5% Au/Carbon catalyst was still active after 31 runs. Also, the percent conversion to DAG with the Pd-Au catalyst remained substantially constant in each run of the series.

We claim:

1. In a process for producing an aldonic acid by the catalytic oxidation of a sugar alcohol having a free terminal hydroxy group and its other free hydroxy groups protected by reaction with a lower alkyl aldehyde, dilower alkyl ketone, benzaldehyde or a benzyl lower alkyl ketone, in an aqueous alkaline medium with a gas selected from the group consisting of oxygen or oxygen mixed with an inert gas utilizing a noble metal catalyst, the improvement comprising the steps of feeding oxygen into said reaction medium at the start of said reaction at a rate such that the presence of a substantial excess of oxygen in the aqueous reaction medium over that consumed by the reaction is substantially eliminated, and maintaining during the reaction the percent of oxygen consumed by the reaction from the inlet gas at a value at least as great as that value at the start of the reaction.

2. The process of claim 1 wherein said ketal of the sugar alcohol is 2,3:4,6-diacetone sorbose.

3. The process of claim 2 where the gas is fed into the reaction medium at the start of the reaction to supply oxygen in an amount of at most 0.4 moles of oxygen per hour per mole of said 2,3:4,6-diacetone sorbose initially present in the reaction.

4. A process for producing an aldonic acid comprising the steps of:
   (a) providing an aqueous alkaline reaction medium containing a polyhydroxy sugar alcohol having a free terminal hydroxy group and its other free hydroxy groups protected by reaction with dilower alkyl, ketone, lower alkyl aldehyde, benzaldehyde and benzyl lower alkyl ketone and a noble metal catalyst;
   (b) passing a gas selected from the group consisting of oxygen or oxygen mixed with an inert gas into said reaction medium at a rate sufficient to supply oxygen in an amount of at most 0.4 moles of oxygen per hour per mole of said sugar alcohol initially present in said reaction medium, to convert said sugar alcohol to said aldonic acid; and
   (c) controlling the rate of oxygen fed into the reaction medium during the entire reaction such that during the reaction, the percent of oxygen consumed from the inlet gas is at least as great as that consumed by passing 0.4 moles of oxygen per mole of the ketal sugar per hour at the start of the reaction.

5. The process of claim 4 wherein said ketal of the sugar alcohol is 2,3:4,6-diacetone sorbose.

6. The process of claim 4 wherein the gas is fed into the reaction medium to supply oxygen at a rate of 0.05 to 0.2 moles of oxygen per mole of said sugar alcohol per hour.

7. The process of claim 4 wherein said metal catalyst is selected from the group consisting of palladium and platinum.

8. A process for producing 2-oxo-gulonic acid comprising the steps of:
   (a) providing an aqueous alkaline reaction medium at a pH of 10 to 13 containing 2,3:4,6-diacetone sorbose and a noble metal oxidation catalyst;
   (b) passing a gas selected from the group consisting of oxygen or oxygen mixed with an inert gas into said reaction medium at a rate sufficient to supply oxygen in an amount of at most 0.4 moles of oxygen per hour per mole of said diacetone sorbose initially present in said reaction medium to convert said diacetone sorbose to said 2-oxo-gulonic acid; and
   (c) controlling the rate of oxygen fed into the reaction medium during the entire reaction such that the percent of oxygen consumed from the inert gas is at least as great as that consumed by passing 0.4 moles of oxygen per mole of the diacetone sorbose per hour at the start of the reaction.

9. The process of claim 8 wherein the noble metal is palladium or platinum.

10. The process of claim 8 wherein the gas is fed into the reaction medium to supply oxygen at a rate of from 0.05 to 0.2 moles of oxygen per mole of sorbose per hour.

11. A process for producing an aldonic acid comprising the steps of:
    (a) providing an aqueous alkaline reaction medium at a pH of 10 to 13 containing a polyhydroxy sugar alcohol having a free terminal hydroxy group and its other free hydroxy groups protected by reaction with a lower alkyl aldehyde, dilower alkyl ketone, benzaldehyde or a benzyl lower alkyl ketone, and a noble metal oxidation catalyst;
    (b) passing a gas selected from the group consisting of oxygen or oxygen mixed with an inert gas into said reaction medium at a rate sufficient to supply oxygen in an amount of from 0.1 to 0.4 moles of oxygen per hour per mole of said ketal of the sugar alcohol initially present in said reaction medium to convert said sugar alcohol to said aldonic acid; and
    (c) continuously diminishing the rate of oxygen fed into the reaction medium during the entire reaction such that the percent of oxygen consumed from the inlet gas is maintained at a value at least as great as the value of oxygen consumed from the inlet gas at the start of the reaction.

12. The process of claim 11 wherein said polyhydroxy alcohol is 2,3:4,6-diacetone sorbose.

13. The process of claim 11 wherein said gas is air.

References Cited

UNITED STATES PATENTS 2,301,811  11/1942  Reichstein _____ 260—340.7
2,483,251  9/1949  Trenner _____ 260—340.7 X DONALD G. DAUS, Primary Examiner J. H. TURNIPSEED, Assistant Examiner